Dec. 26, 1967     S. J. ANDREASEN ET AL     3,360,166
APPARATUS FOR MIXING AND DISPENSING, BY
HYDRAULIC PRESSURE, AN AQUEOUS
SOLUTION CONTAINING PLANT LIFE
Original Filed March 4, 1965     7 Sheets-Sheet 1
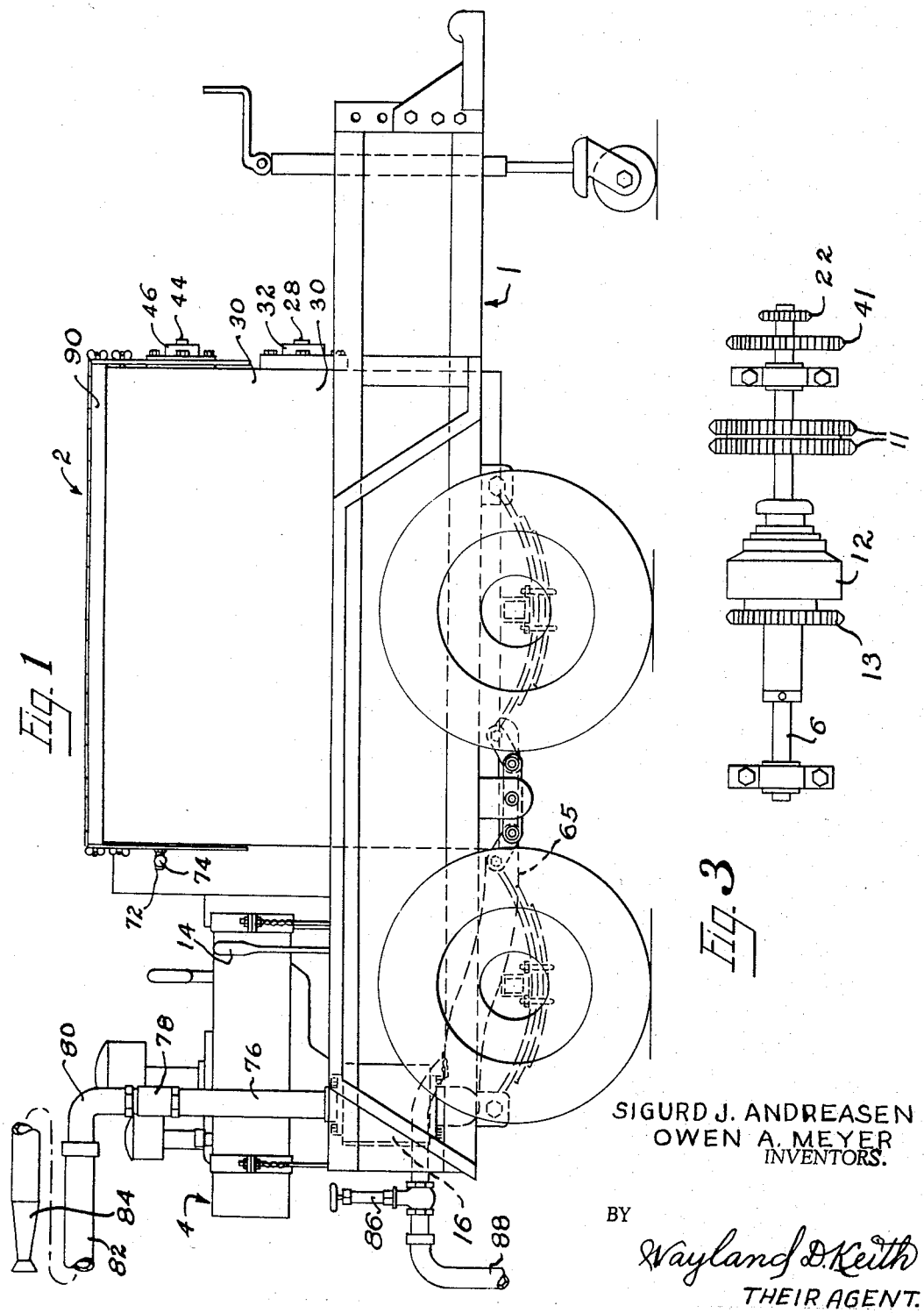
SIGURD J. ANDREASEN
OWEN A. MEYER
INVENTORS.
BY
*Wayland D. Keith*
THEIR AGENT.

Dec. 26, 1967
S. J. ANDREASEN ET AL
3,360,166
APPARATUS FOR MIXING AND DISPENSING, BY
HYDRAULIC PRESSURE, AN AQUEOUS
SOLUTION CONTAINING PLANT LIFE
Original Filed March 4, 1965
7 Sheets-Sheet 2
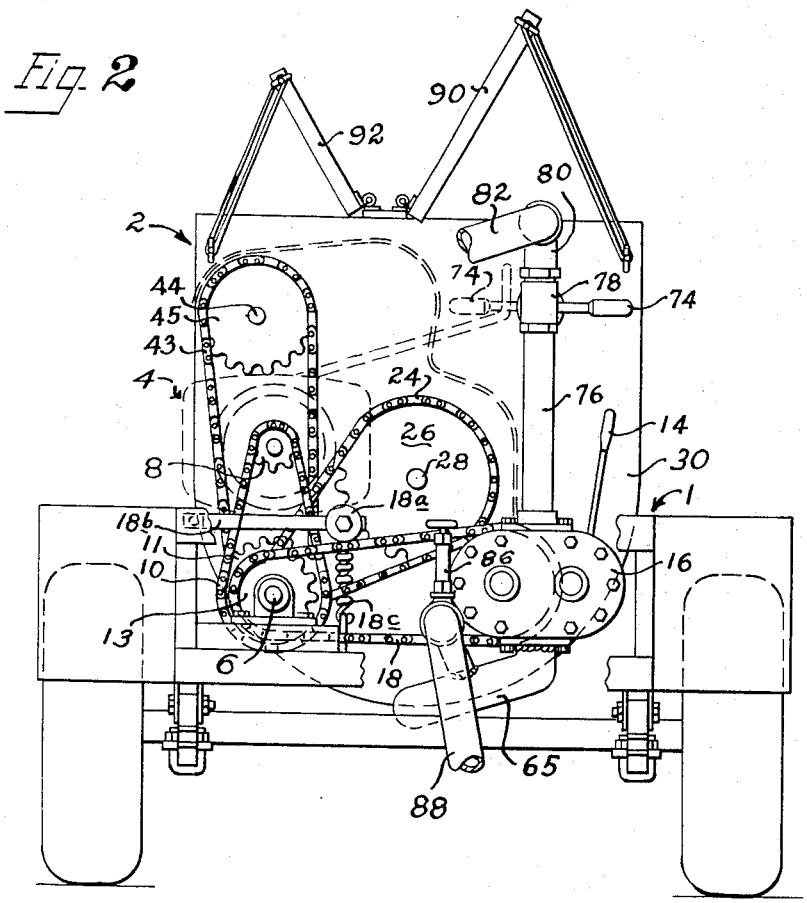
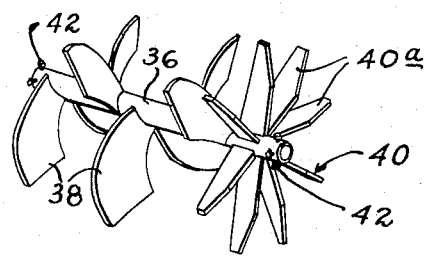
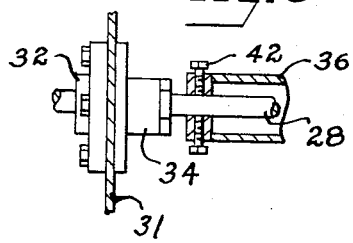
SIGURD J. ANDREASEN
OWEN A. MEYER
INVENTORS.
BY
Wayland D Keith
THEIR AGENT.

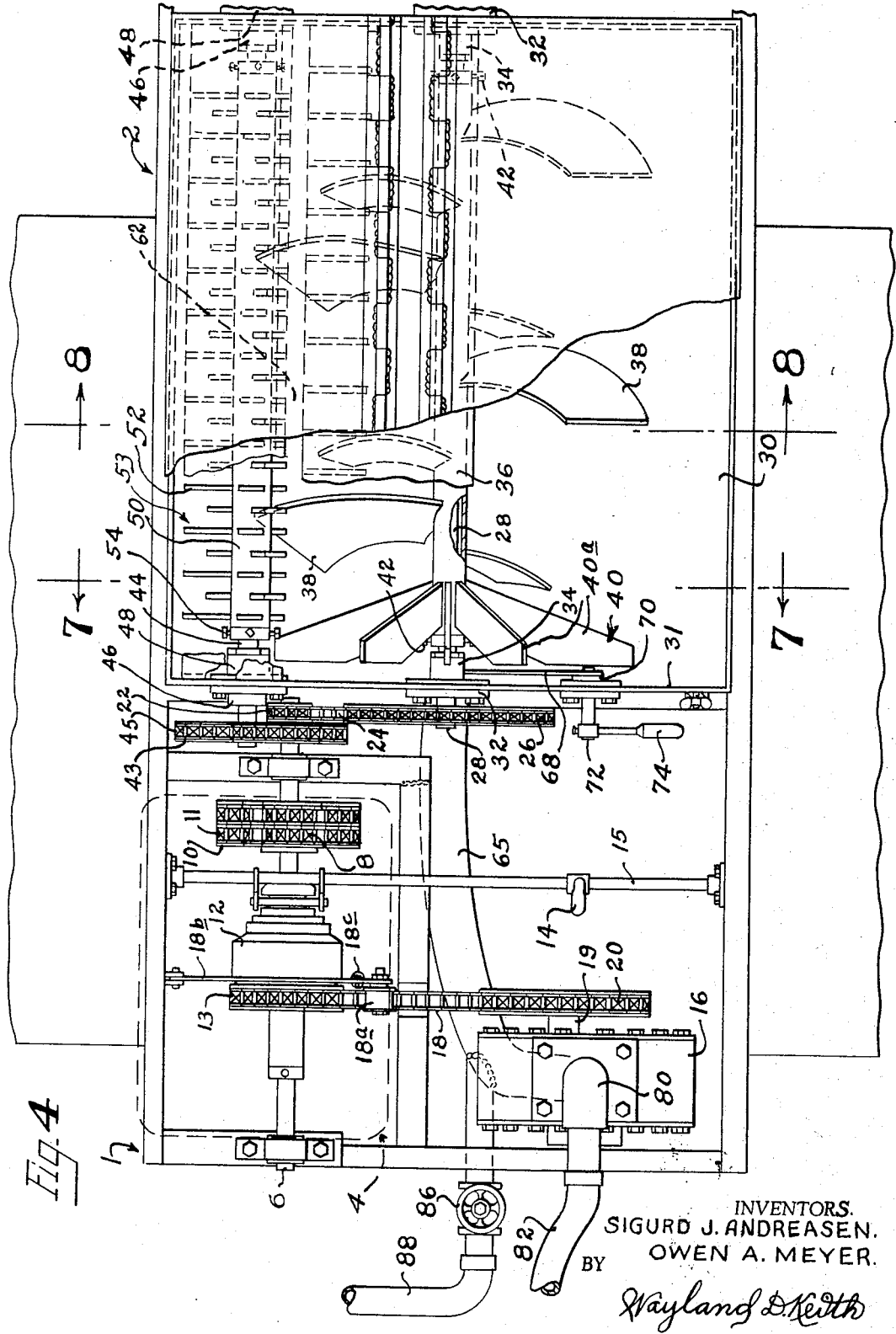

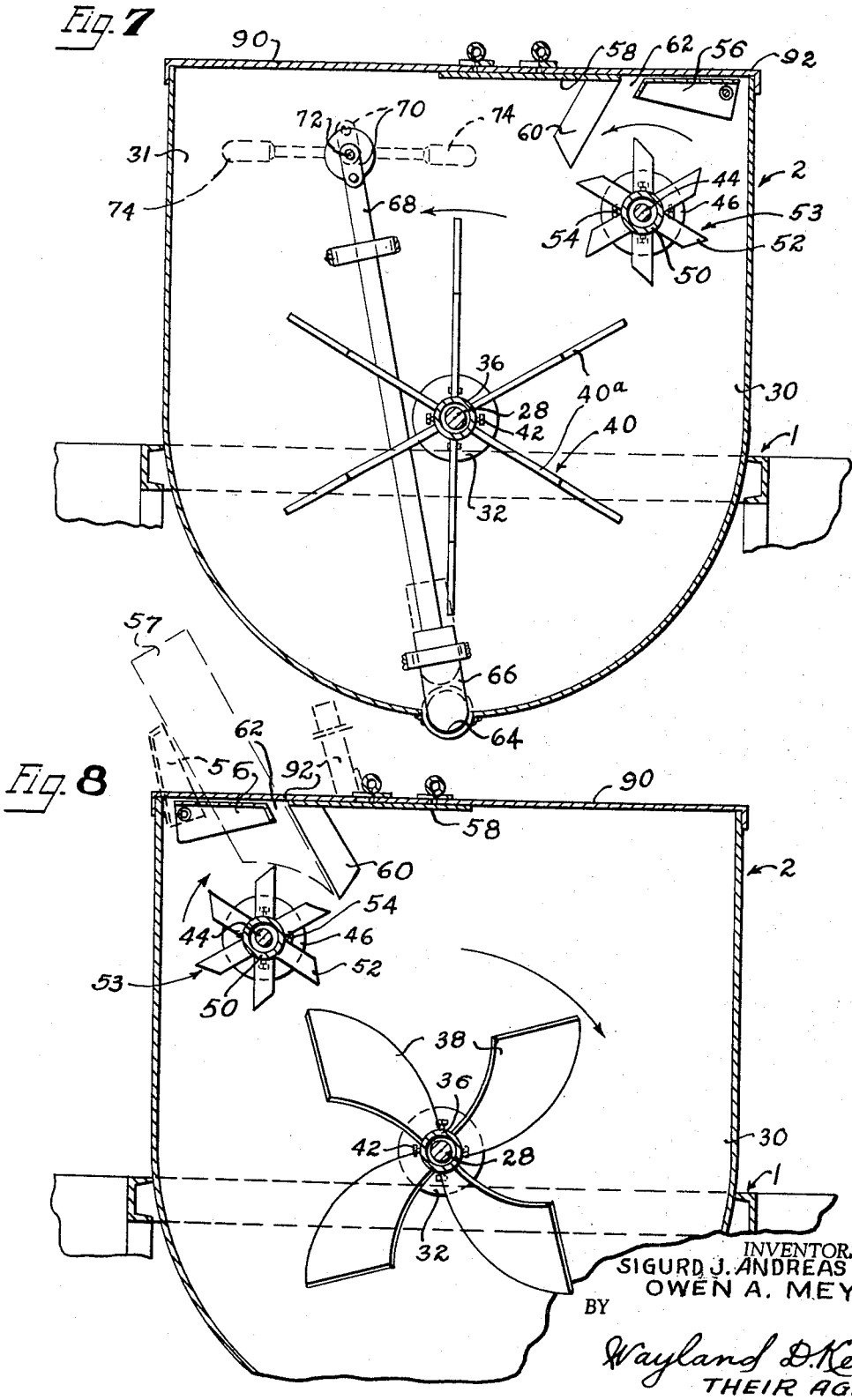

Dec. 26, 1967 S. J. ANDREASEN ET AL 3,360,166
APPARATUS FOR MIXING AND DISPENSING, BY
HYDRAULIC PRESSURE, AN AQUEOUS
SOLUTION CONTAINING PLANT LIFE
Original Filed March 4, 1965 7 Sheets-Sheet 5
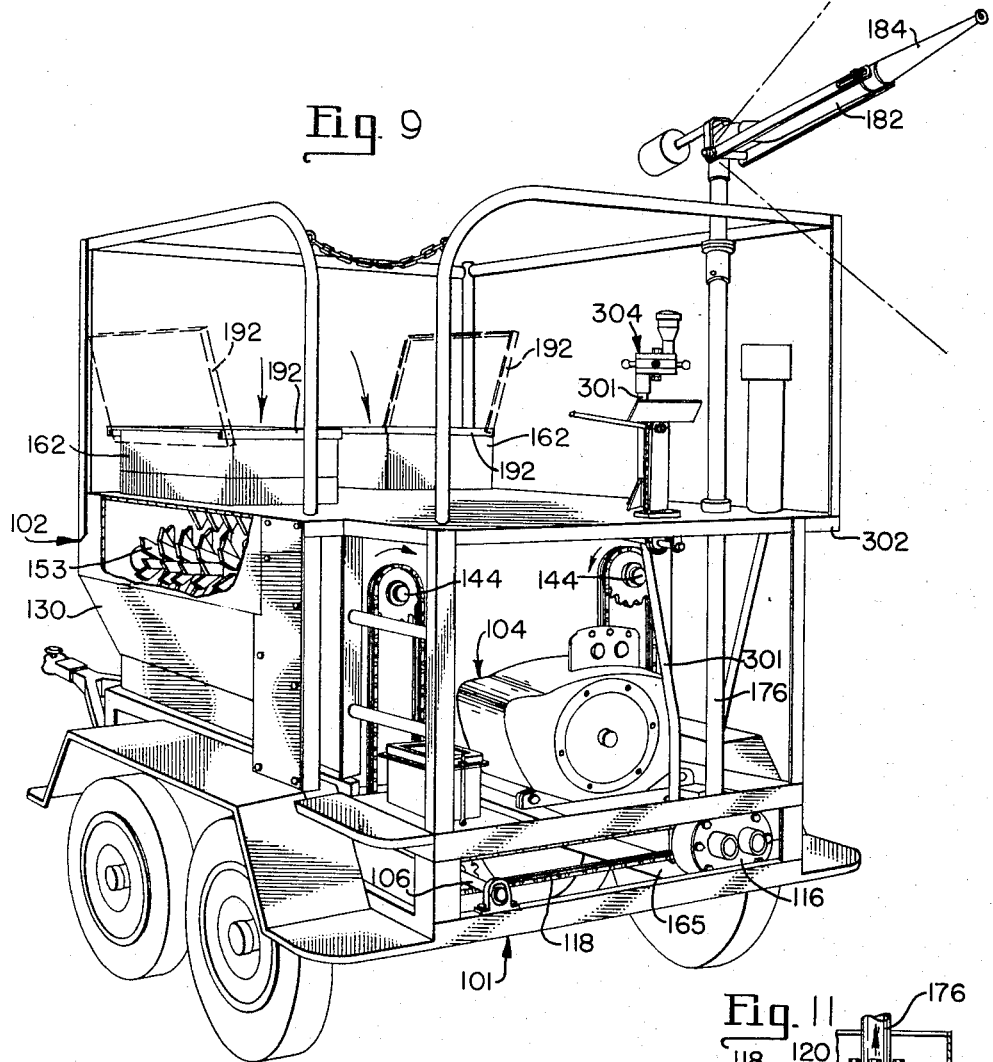
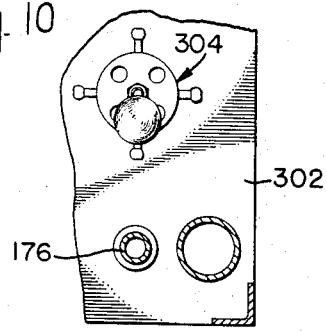
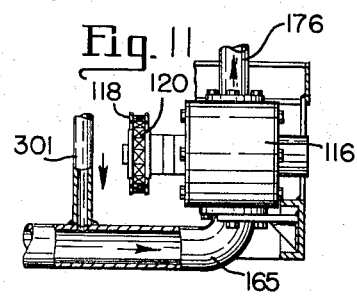
OWEN A. MEYER
SEGURD J. ANDREASEN
*INVENTORS*
BY
*Wayland D. Keith*
THEIR AGENT

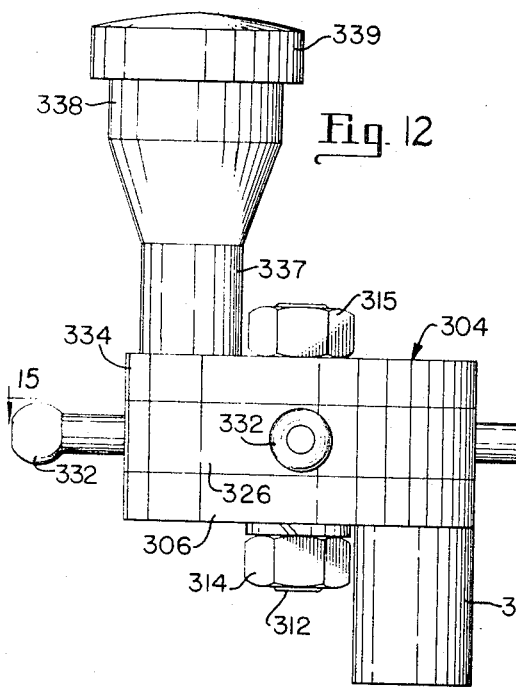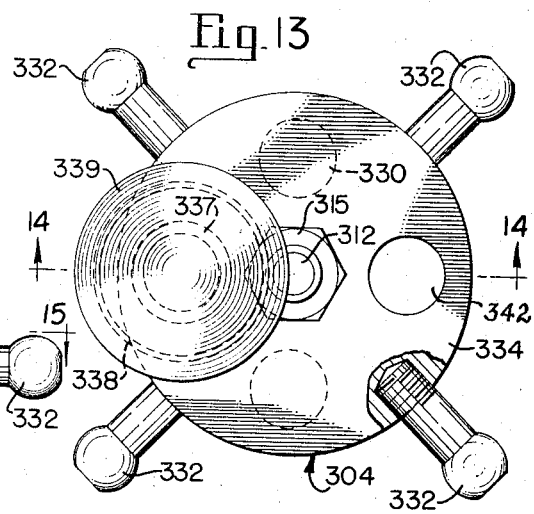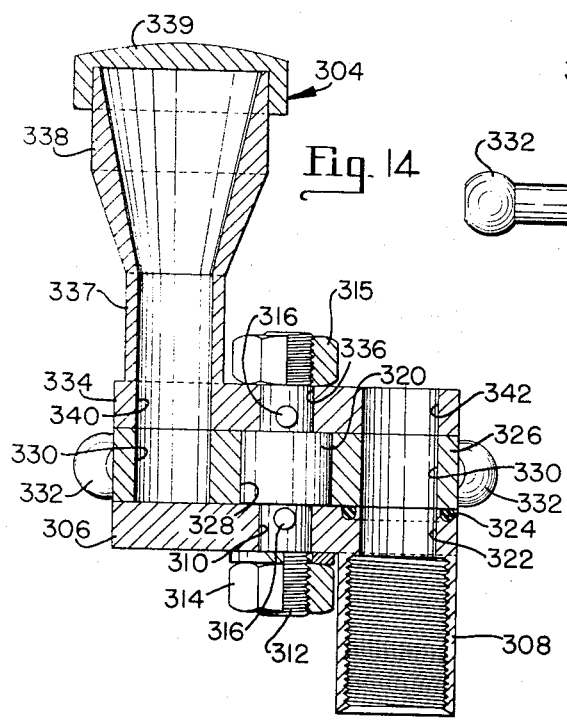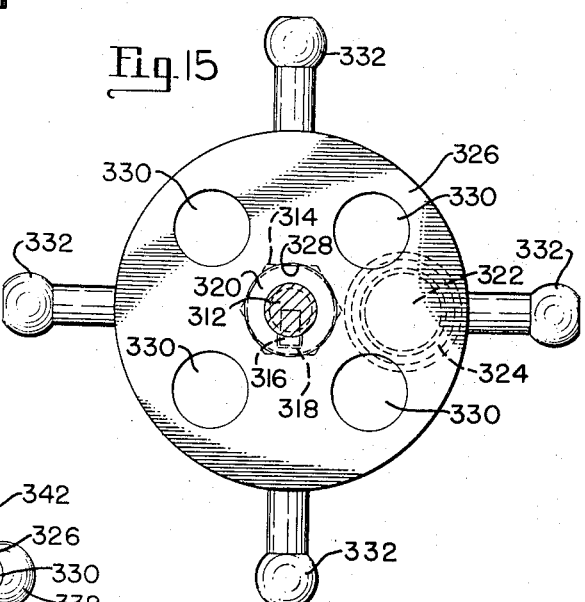

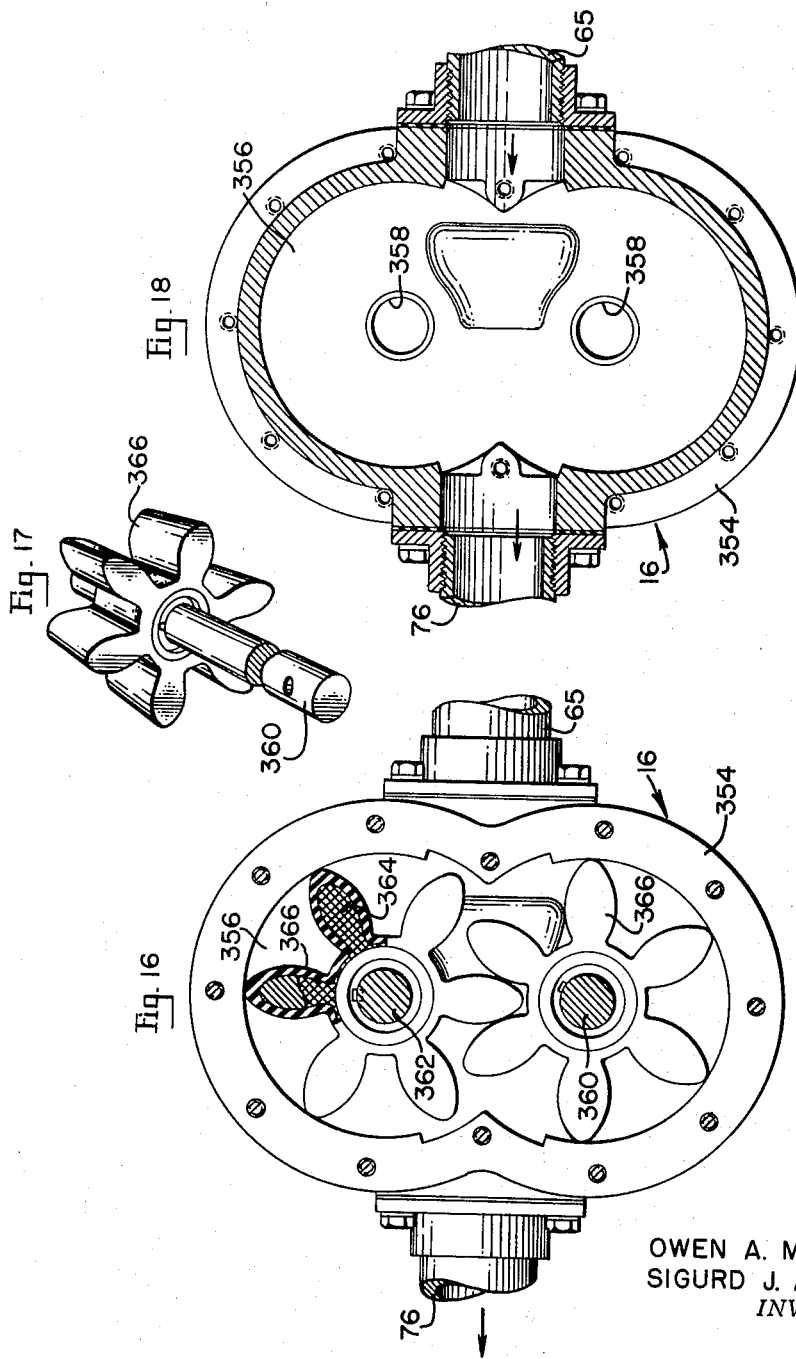

United States Patent Office 3,360,166
Patented Dec. 26, 1967

3,360,166
APPARATUS FOR MIXING AND DISPENSING, BY HYDRAULIC PRESSURE, AN AQUEOUS SOLUTION CONTAINING PLANT LIFE
Sigurd J. Andreasen and Owen A. Meyer, both of P.O. Box 630, Bowie, Tex. 76230
Continuation of abandoned application Ser. No. 441,405, Mar. 4, 1965. This application June 10, 1966, Ser. No. 558,197
11 Claims. (Cl. 222—136)

ABSTRACT OF THE DISCLOSURE

The present device provides for moving a reservoir, having a power driven mixer therein, over the terrain. Which mixer mechanically mixes, within the reservoir, a slurry containing water, fiber, and/or fertilizer with plant life capable of germination, such as seeds roots or sprigs. This slurry is withdrawn from the reservoir by a pump and is directed, by pump pressure, onto the terrain to perform the planting in a expeditious manner, whether on level terrain or on terrain inaccessible to vehicular travel. Provision being made for selectively directing loose seed, in measured amounts, into the slurry, so the planting may be carried out in a predetermined manner, such as planting flower seeds to produce a certain design of planting.

---

This application is a continuation application of and co-pending with application Ser. No. 441,405, Method of and Apparatus for Mixing and Dispensing, by Hydraulic Pressure, an Aqueous Solution Containing Plant Life, filed Mar. 4, 1965, now abandoned, which last mentioned application is a continuation-in-part of our application Ser. No. 285,333, filed June 4, 1963, now abandoned, for Apparatus for Mixing and Dispensing, by Hydraulic Pressure, an Aqueous Solution Containing Plant Life, which latter application is now abandoned. This invention relates to improvements in seeding and/or planting apparatus and the method of carrying out the planting by the use of the apparatus, and more particularly to the planting of seeds, grass sprigs and/or roots or the like by hydraulic pressure, whereby the hydraulic pressure embeds the seed, or grass sprigs and/or roots in the soil of the earth, which is being planted by the seeding apparatus.

The present invention is designed to handle grass sprigs and/or roots or seed within the hydraulic mixture of water and a binder, or water, fertilizer and a binder in such manner that the material used for planting will be evenly distributed over the surface of the terrain, with the maximum number of grass sprigs and/or roots or seeds remaining unimpaired, during the planting process, because of being crushed.

Furthermore, the present invention utilizes a pumping and mixing system which is so constructed that the grass sprigs and/or roots or seed are pressed into a pliant rubber covering of the pump impeller while material is passing therebetween to be discharged without causing material injury to the material being planted, especially to sprigs and/or roots, such as that of Bermuda grass, Saint Augustine grass, and other grasses used for lawns and meadows.

The pump utilized to pump the slurry, containing grass sprigs, roots or seeds, is of the character set forth in our Patent No. 2,833,224, issued May 6, 1958, for Rotary Pumps, and our Patent No. 2,957,428, issued Oct. 25, 1960, for Rotary Pump Housings and Bearing Mounts, which pump discloses the use of elastomer covered, gear type impellers.

An object of this invention is to provide an apparatus whereby a hydraulic mixture, such as water, a pulp binder, fertilizer into which grass sprigs, roots or seeds may be mixed to form a homogeneous mass, which mass is pumped through a pump without undue damage to the roots or sprigs of grass or to the seeds.

Another object of the invention is to provide a portable planting device for planting grass springs and/or roots or seeds of vegetation by the hydraulic method whereby the seeds are kept in evenly distributed suspension while being pumped out through a hose for delivery onto the terrain, which may be a sloping road embankment, a lawn, a meadow or the like which is being planted.

Still another object of the invention is to provide a planting device for planting grass sprigs and/or roots or seeds of vegetation, which may use a third agent, such as a fibrous material, which may be paper pulp, discrete cellulose pulp fibers, or the like, to cause the adherence of the sprigs, roots or seeds to steep inclines, until the grass sprigs, roots or seeds have germinated and taken root to hold them in the terrain.

A further object of the invention is to provide a planting device for planting by the hydraulic method, which device is simple in construction, is a self contained unit, efficient in operation, relatively low in the cost of manufacture, and which is portable so it may be readily moved from place to place without special machinery or equipment.

An object of this invention is to provide an apparatus for mixing grass sprigs and the like, with a binder, such as discrete cellulose, with an aqueous solution and for hydraulically dispensing the mixture onto the terrain.

Still a further object of the invention is to provide a vehicle with a power plant thereon which is connected in driving relation with a mixer element to mix grass sprigs and the like with an aqueous solution, and which vehicle is provided with an operator station to enable the hydraulic material, containing grass sprigs and the like, to be dispensed while the vehicle is moved over the terrain.

Yet another object of the invention is to provide a seed dispenser for selectively dispensing bulk seed into the suction side of a pumping system.

A still further object is to provide a seeder attachment for a hydraulic planting system, which may be manually operated to selectively dispense a measured amount of seed into the suction side of the pumping system and to close a conduit into which the seed is dispensed so as to prevent entrance of air into the pumping system.

Yet a further object of the invention is to provide an apparatus for and a method of dispensing grass sprigs and the like, which contain live nodules, onto the terrain by hydraulic pressure With these objects in mind, and others which will become manifest as the description proceeds, reference is to be had to the accompanying drawings in which like reference characters designate like parts in the several views thereof, in which:

FIG. 1 is an elevational view of the invention, with parts being broken away and with parts being shown in section to bring out the details of construction;

FIG. 2 is an end elevational view of the invention taken from the power end thereof, but with parts broken away and with the power plant being shown in dot dash outline to bring out the details of construction;

FIG. 3 is an enlarged fragmentary view of the countershaft and clutch mechanism for operating the device;

FIG. 4 is a fragmentary top plan view of the device with parts broken away and with the cover removed therefrom, to show the inner construction of the device;

FIG. 5 is a fragmentary sectional view of a shaft and a mounting therefor, with parts shown in full outline;

FIG. 6 is a perspective view of the mixer or impeller shown apart from the mixing chamber;

FIG. 7 is a sectional view taken on the line 7—7 of FIG. 4, looking in the direction indicated by the arows, showing the shut-off valve in closed position in full outline, and in open position in dashed outline;

FIG. 8 is a sectional view taken on the line 8—8 of FIG. 4, looking in the direction indicated by the arrows, with a shelf shown in full outline, in the normal operating position, and with the same shelf shown in dashed outline in position to give access to the interior of the mixing chamber;

FIG. 9 is a perspective view of a trailer mounted, modified form of the mixer, having an operator platform thereon, for mixing grass sprigs, a fiber, such as discrete cellulose, and/or fertilizer with water, with parts being broken away and shown in section to show the details of construction, and with parts being shown in alternate positions in dashed outline, a center line to show the angular movement of a hydraulic discharge nozzle for hydraulically planting sprigs, seeds and the like;

FIG. 10 is an enlarged, fragmentary plan view of a portion of the operator platform, showing a seeder attachment thereon;

FIG. 11 is an enlarged elevational view of a fragmentary portion of the trailer frame showing a pump driving mechanism associated therewith, showing a suction line from the reservoir with a seed dispenser inlet pipe connected thereto and showing the discharge leading from the pump;

FIG. 12 is an elevational view of a seeder attachment;

FIG. 13 is a top plan view thereof, with parts being broken away and shown in section, and showing the seeder attachment in discharge position;

FIG. 14 is a sectional view taken on the line 14—14 of FIG. 13, looking in the direction indicated by the arrows;

FIG. 15 is a sectional view taken on the line 15—15 of FIG. 12, looking in the direction indicated by the arrows;

FIG. 16 is an elevational view of the pump used, the cover plate being removed therefrom, and showing parts as being broken away and in section;

FIG. 17 is a perspective view of an impeller mounted on a drive shaft, shown apart from the pump housing, with a portion of the shaft thereof being broken away and shortened; and FIG. 18 is a sectional view taken medially through the impeller housing, showing a portion of pipe connected thereto, the impeller being shown in the housing.

With more detailed reference to the drawing, the numeral 1 designates generally a vehicle frame, which may either be a trailer frame, a truck frame, or the like, for transporting the hydraulic mixer device, designated generally by the numeral 2, over the terrain. A power plant, designated generally at 4, is positioned on one end of the frame 1 and is connected in driving relation therewith through endless transmission means 10, or the like, to a countershaft 6. In the present instance, the power plant 4 has a sprocket 8 thereon around which a chain 10 passes which is connected to a countershaft 6 by a sprocket 11 to enable the power plant 4 to drive the countershaft 6. A clutch 12 is mounted on the countershaft 6, which clutch has a sprocket 13 thereon, which, by use of clutch lever 14, clutch 12 may be selectively engaged and disengaged to connect chain 18 in driving relation with sprocket 20 on the shaft 19 of the pump to drive the pump 16. The chain 18 is maintained in taut relation by an idler roller 18a which is supported on a pivoted arm 18b in such manner that a spring 18c will maintain chain 18 taut at all times.

A further sprocket 22 is mounted on countershaft 6 and has a chain 24 therearound which surrounds a sprocket 26 on mixer shaft 28. The mixer shaft 28 is journaled a spaced distance above the bottom of mixer reservoir 30 on bearings 32. A stuffing box or fluid seal 34 surrounds shaft 28 at each end thereof, inwardly from bearings 32 to prevent entrance of water and foreign matter into bearings 32. The shaft 28 has a tubular member 36 slid thereover, on which tubular member 36 vanes or propeller blades 38 are secured, which propeller blades 38 will urge the hydraulic mass in reservoir 30 toward one end thereof and toward a further mixer element 40 wtihin reservoir 30. The mixer element 40 has radial blades 40a, which radial blades are secured to tubular member 36. The tubular member 36 is attachably secured to the shaft 28, as by set screws, pins, or the like, as indicated at 42 (FIGS. 4 and 5).

The countershaft 6 has a sprocket 41 secured thereon, which sprocket is in driving relation with chain 43 to drive sprocket 45, which sprocket 45 is secured to shaft 44 so as to rotate the toothed disintegrator designated generally by the numeral 53. The shaft 44 is journaled in bearings 46 near the top of reservoir 30 and to one side thereof, as will best be seen in FIGS. 4, 7, and 8. Packing glands 48 surround shaft 44 to prevent the entrance of water or foreign matter into bearings 46, in a manner similar to stuffing boxes 34. A tubular shaft 50, having radially extending teeth 52 secured thereto, is slid over shaft 44 and is secured thereto as by set screws 54, in a manner similar to that shown in FIG. 5.

Each tooth 52 has the forward or leading edge thereof pointed, so as to disintegrate bales of fiber, such as paper fiber, discrete cellulose pulp fiber or the like, which is known by the trade name of "Turfiber," and is manufactured by the International Paper Company, in the Unted States of America.

The bales of fiber are usually green in color and are compressed to a relatively high density. Therefore, considerable force is required to disintegrate these bales of fiber into shreds. By manual methods this would be impractical. With the present arrangement, a splash plate 56, is pivoted on the upper side of reservoir 30, and when cover 92 is open, the splash plate 56 may be moved from horizontal position as shown in full outline in FIGS. 2, 7, and 8 to an upright position as shown in dashed outline shown in FIG. 8, and with the cover 92 in open position, a bale of fiber 57 is fed downward, as indicated in dashed outline in FIG. 8, so the teeth 52 of disintegrator 53, which disintegrator is rotatably mounted near the upper side of reservoir 30, cooperates with the downwardly extending stationary teeth 60, which teeth 60 are mounted on plate 58 on the upper side of said reservoir 30, to shred the fiber of the bale into small particles. The disintegrator 53 is power driven at a relatively high speed to cause a thorough disintegration of the bale of fiber. By having the splash plate 56 pivoted and having a downturned lip thereon, the water and slurry with which the fiber is mixed will be retained by the plate 56, and the slurry and water is prevented from splashing out of the reservoir while the reservoir 30 is being charged with the fiber. The teeth 52 on tubular shaft 50 are arranged in alternate longitudinal spacing with respect to the stationary teeth 60 mounted on plate 58, which teeth 60 are supported thereby, therefore the fiber will be directed between teeth 52, on disintegrator 53, and stationary teeth 60, which fiber will be thoroughly shredded.

An opening 62 is formed between splash plate 56 and plate 58, through which opening the seeds, grass sprigs and/or roots may be fed into reservoir 30, when cover 92 and splash plate 56 are raised. Sprigs and roots will be shredded into useable size portions to be mixed with the water or slurry containing the fiber. Soil and/or fertilizer, if these additives are desired, are added to the water in which the fiber is mixed. With the grass sprigs, roots or seeds and the fiber being mixed in the reservoir 30, with other additives, such as fertilizer or soil, the propeller blades 38 and radial blades 40 will mix the contents of the reservoir 30 into a homogenous mixture for discharge out through outlet 64 in the lower side of reservoir 30. The outlet 64 may be selectively closed or opened to the desired extent by means of a gate valve 66, which gate valve has a bar 68 extending upward therefrom to connect with a lever 70 which is secured to shaft 72. The shaft 72 extends outwardly through the wall 31 of reservoir 30, as will best be seen in FIGS. 4 and 7. The shaft 72 has an operating handle 74 on the outer end thereof by which to open and close the outlet 64 which leads to the inlet pipe 65 of pump 16, which pump inlet pipe 65 leads to the suction side of the pump 16.

The pump 16 has an outlet pipe 76 extending upward therefrom, on which outlet pipe 76 a swivel joint 78 is mounted to enable a coupling 80 to be swiveled therearound in any desired direction. It is preferable to have the coupling 80 extend outward at an angle, and to have a hose 82 connected thereto so that the material discharged from pump 16 may be directed through the hose 82 outward through a suitable nozzle 84 to direct the seeds, grass sprigs, or grass roots to be planted, under hydraulic pressure onto the surface of the terrain, regardless of the inclination thereof. With the present system, the mixture, directed under hydraulic pressure against a steep incline, will usually adhere thereto, with the fiber clinging to the terrain to hold the seeds, grass sprigs or grass roots into contact relation with the terrain, with the fiber retaining the moisture so sprigs or roots of grass are prevented from drying out and dying before germination can take place or before moisture can be added.

If desired, soil or fertilizer, or both, can be added to the slurry, and with the pump which has impeller blades, such as gears, which are covered with a soft elastomer material, as set forth in the above mentioned patents, the seeds, grass sprigs and/or roots are pressed into the impeller blades as they pass therethrough without injury thereto sufficient to prevent germination of a sufficient amount of seed or the sprouting of enough grass sprigs or roots to obtain the desired stand of grass or other vegetation being planted by the use of the present apparatus.

When it is desired to agitate the mixture in the reservoir 30 without running the pump 16, the clutch 12 may be disengaged by moving lever 14 from the engaged position to a disengaged position, which will rotate shaft 15 to move a throw-out collar to disengage the clutch 12 from driving sprocket 13, which will cause pump 16 to cease exerting suction on pump inlet 65, thereby the mixture in reservoir 30 may be blended and mixed within the reservoir by propeller blades 38 and radial blades 40, until the mixture is ready for discharge.

When it is desired to discharge the mixture from reservoir 30, the clutch 12 is engaged to drive sprocket 13 and chain 18, which in turn rotates sprocket 20, which is secured to shaft 19, so as to rotate shaft 19 to drive pump 16. Then, with valve 66 open, the slurry, containing the seeds, grass sprigs, grass roots, or other vegetation to be planted, together with the fiber, water and such other additives as go to make up the slurry, is withdrawn from reservoir 30 through pipe 65 into pump 16 and is discharged through outlet pipe 76, swivel joint 78, coupling 80 and into hose 82 and out through nozzle 84. The flow may be opened or closed by raising or lowering gate valve 66 in the manner indicated in full outline, and in dashed outline, respectively, in FIG. 7.

When it is desired to recharge the reservoir 30 with water, this may be done from an open pond or the like, by closing gate valve 66 and opening valve 86. The end of a suction hose 88, which hose is attached to pump 16, is then placed in the water which is to be withdrawn from the pond by the suction of pump 16. The hose 82, which is connected to the discharge of pump 16, discharges water from pump 16 into the reservoir 30 through the opening formed in the reservoir 30 when the cover 90 or the cover 92 is in open position. Therefore, the unit is not dependent upon a water wagon to furnish water thereto.

The pump, designated generally at 16, has a housing 354 which includes a plate 356 on each end thereof, which end plates 356 each has a pair of bushings or bearings 358 associated therewith. A metal spider 364 is mounted on the respective shafts 360 and 362. Each of the spiders is covered with an elastomer, rubber-like material 366, which is vulcanized or bonded to the respective spiders so as to form involute gear impellers, as will best be seen in FIGS. 16 and 17.

The elastomer covering of the respective impellers is in wiping contact with the interior arcuate surfaces of the gear housing 354 and in wiping contact with the respective end plates 356 so as to form a fluid seal. However, the elastomer is of such resiliency or softness as to enable granular material, plant seed, plant roots or sprigs to be embedded or impressed into the elastomer material, without the plant life suffering any marked degree of damage that would impair the germination of the seed or the growth of the roots or sprigs, which have passed through the pump.

When seeds or roots and sprigs of vegetation are pressed into the elastomer covering of the metal spiders, they are ejected therefrom when the elastomer material springs back into shape, when portions of the impellers are no longer pressed together, thereby all material passing through the pump is discharged onto the surface to be planted in condition for germination or growth.

The present mixing and pumping system is so designed as to maintain plant life, such as seeds, roots and sprigs in agitated condition within reservoir or hopper 30, and to be discharged out through discharge pipe 76 by pump 16, so that grass seeds, roots and/or sprigs may be discharged, together with a fibrous binder, onto the terrain being planted so that the plant life, particularly sprigs and roots, will be discharged onto the terrain without material damage thereto, which would retard germination and growth thereof, which will enable the plant life discharged to be maintained in a moist mulch protective covering until the plant life, such as roots and sprigs, is sufficiently rooted to enable continued growth thereof.

Modified form of invention

The form of the invention as shown in FIGS. 9 through 15, inclusive, discloses an apparatus for mixing and dispensing, by hydraulic pressure, an aqueous solution containing plant life, and more particularly to a vehicle which has an elevated platform thereon where an operator may stand to dispense the aqueous solution containing plant life through a horizontal arc of 360 degrees and through an elevated arc of approximately 90 degrees, thereby enabling the operator to cover a wide area, as the vehicle is moved over the terrain.

The numeral 101 designates generally a vehicle such as a trailer which has mounted thereon a hydraulic mixing device generally designated by the numeral 102, which mixing device is of the general character as set forth in the first form of the invention. A power plant 104 is mounted on the trailer and is connected to countershaft 106 in a manner set forth in the aforementioned form of the invention. Therefore, the specific mechanical details of the drive mechanism are not described in detail, for sake of brevity, except for that portion particularly important to the improvements in the present device.

The present device feeds the mixture of fiber, fertilizer, grass roots and additives down through neck openings 162 of the mixing device when doors 192 are open so that the fiber will be brought into contact relation with disintegrator generally designated by the numeral 153. The present device has a disintegrator on each side thereof as indicated in FIG. 9, which disintegrators are mounted on respective shafts 144, which shafts turn in the direction indicated by the arrows in FIG. 9, by conventional gearing, as is well understood in the art of mechanics.

The present form of the invention has a pump 116 mounted on the frame of trailer 101, which has a suction pipe 165 for withdrawing a mixture of plant life and water and other additives from a reservoir 130 and directing the material through the pump 116 and out through discharge pipe 176 and through a flexible member 182, out through nozzle 184 onto the terrain.

The present invention is so constructed, that plant life, as it passes through the pump mechanism, is readily yielded up by the pump without material damage to the nodules, buds, or roots passing therethrough. Therefore, a relatively high fertilization rate of grass and other plant life seeded by the present system is had.

The pump 116 is shown apart from the mixing and dispensing unit in FIG. 11 and a sprocket 120 is shown connected to a chain 118, so when the chain 118 is driven by a power plant 104, the countershaft 106 draws the aqueous solution, containing plant and/or other additives, from reservoir 130 and through suction pipe 165 into pump 116, whereupon it is discharged upward through discharge pipe 176 to be discharged as hereinbefore set forth.

A pipe 301 is connected in fluid communication with suction pipe 165, intermediate the reservoir 130 and the pump 116, which pipe extends upward above a platform 302 and has a seeder attachment, generally designated by the numeral 304, connected thereto, as will best be seen in FIG. 9. The seeder attachment 304 is so connected as to enable a measured amount of bulk seed to be introduced into the aqueous solution at selected intervals.

The present seeder device comprises a base 306, which has a downwardly extending threaded coupling 308 of a suitable size to connect to the pipe 301. The base 306 has a central hole 310 therein in which is fitted an axial bolt 312, which axial bolt has a nut 314 thereon to hold bolt 312 against longitudinal movement with respect to base 306. A pin 316 extends radially outward into a slot 318 in base 306 to fixedly secure the bolt 312 against relative turning movement with respect to base 306. The bolt 312 has an enlarged cylindrical shouldered portion 320, forming an axle, immediately above and in binding engagement with the upper face of the base 306.

The base 306 has an outlet or discharge hole 322 formed vertically therethrough in a side thereof, which hole 322 is surrounded by an O-ring 324 which is fitted into an annular groove in the conventional manner so as to form a seal between the upper face of base 306 and an apertured rotary, disc-like member 326, which disc-like member has a central hole 328 which is fitted in journaled relation on the enlarged cylindrical portion 320. The apertured rotary disc-like member 326 has a plurality of apertures 330 therein at spaced circumferential intervals, which apertures are equally spaced from the axis of the disc 326 so when rotated, as by outstanding arms 332, the apertures 330 will be brought into register with the discharge hole 322 in base 306, as will best be seen in FIGS. 13 and 14.

A cover member 334 has a centrally positioned hole 336 therein to receive an end portion of bolt 312 above the enlarged cylindrical shouldered portion 320. A second dowel pin 316 extends outwardly from bolt 312 into a slotted recess in the cover 334 similar to recess 318 in the base and upon nut 315 being screwed into binding relation with the upper face of cover member, the cover member 334 is held in fixed relation with respect to base member 306. The length of the shouldered portion of member 320 is substantially the same as the thickness of the disc 326; therefore the upper surface of the disc 326 and the lower surface of cover 334 are in close bearing relation. The cover plate has an upstanding hollow neck 337 to which a supply hopper 338 is connected with the opening in neck 337 registering with a hole 340 in cover member 334. A cover 339 is provided for supply hopper 338 so that the hopper 338 may be filled with seed or the like, and covered to prevent loss or damage to the mechanism and contents because of weather.

The cover 334 has holes 340 and 342 vertically therethrough, which holes are the same spaced distance from the axis of cover 334 as the distance from the axis of rotatable disc 326. It is preferable to have the hole 342 diametrically opposite hole 340; therefore when the apertures 330 in disc 326 pass beneath hole 340 the apertures will register, to form seed receiving pockets, and when supply hopper 338 and the hollow neck 337 are filled with seed or granular material such as fertilizer, the seed or the like will pass downward into apertures 330. Upon rotating the disc 326 the measured amount of seed or the like, within the apertures of the disc, will be confined therein. The disc may be rotated so the apertures in disc 326 will register with the holes 322 and 342 in the base and cover, respectively, whereupon the suction from the pump, when running, will exert a suction through pipe 301 and through coupling 308, hole 322, apertures 330, and hole 342 to draw the seed and other material into pump inlet pipe 165, whereupon the disc 326 may be rotated from the positions shown in FIGS. 13 and 14 to the position shown in FIG. 15, whereby the O-ring 324 will form a seal with the lower face of rotatable disc 326 as the circumferential spacing of holes 330 is greater than the diameter of holes 322. Therefore, the O-ring will form an air-tight seal, thereby preventing entrance of air into the pumping system. The seed thus dispensed will plant a pattern or area in accordance with the hydraulic material being dispensed in that period of time.

It is to be pointed out that the present system enables the use of bulk seed, which are drawn immediately into the suction of the pump ready to be dispensed without the necessity of crushing any casing or cartridge shell that might be therearound. Therefore, an even distribution of the seed over the particular area or pattern for which the seed are intended, may be had, thereby obviating the possibility of the cartridge or shell being partly crushed and all of the seed being directed onto one small spot, rather than being evenly distributed over the selected area.

While the invention has been shown and described in its simplest form for use in connection with a mixing and dispensing apparatus, it is understood that the device may be made to such sizes and of such proportions as might accommodate various installations without departing from the spirit of the invention or the scope of the appended claims.

Having thus clearly shown and described the invention, what is claimed as new and desired to be secured by Letters Patent is:

1. In a hydraulic planting apparatus for dispensing hydraulic material onto the terrain, which material contains plant life and fiber,
   (a) a frame,
   (b) a reservoir mounted on said frame,
   (c) a first shaft extending into said reservoir and being journaled therein for rotation,
   (d) longitudinally and circumferentially spaced apart, spirally arranged impeller blades on said first shaft, within said reservoir, along a portion of the length thereof,
   (e) radially extending blades forming an impeller, which impeller is mounted on said first shaft near one end of said reservoir to receive hydraulic material thereinto from said spirally arranged blades,
   (f) a power plant mounted on said frame,
   (g) a pump mounted on said frame,
   (h) an outlet pipe connecting the lower portion of said reservoir with said pump,
   (i) a discharge pipe extending outwardly from said pump to discharge hydraulic material onto the terrain,
   (j) transmission drive means connecting said power plant and said pump to selectively drive said pump,
   (k) a second transmission drive means connected to said power plant and to said first shaft, which mounts said impeller mixing blades to rotate said first shaft with said impeller mixing blades thereon,
   (l) a second shaft extending into said reservoir near the upper end thereof, which shaft is parallel to said first shaft, (m) pointed fingers secured to and extending outward from said second shaft, (n) a third transmission means connecting said power plant in driving relation with said second shaft for rotation of said second shaft, with said pointed fingers thereon, (o) a support plate mounted longitudinally in said reservoir, near the top thereof, said support plate being in close proximity to said second shaft, having said outwardly extending pointed fingers thereon, (p) downwardly extending fingers mounted on the lower side of said support plate and being spaced in close proximity to the outer ends of said pointed fingers on said second shaft, (1) said fingers on said second shaft being adapted to rotate in close proximity to said pointed fingers on said support plate so as to disintegrate compressed fiber and to direct the disintegrated fiber into said reservoir.

2. In a hydraulic planting apparatus for dispensing hydraulic material onto the terrain, which material contains plant life, as defined in claim 1, wherein;

(a) said pump is a positive action gear pump, (1) the gears of said pump having resilient facing thereon, which facings are of a texture and consistency to embed material being planted thereinto, without affecting the fertility of said material being planted.

3. In a hydraulic planting apparatus for dispensing hydraulic material onto the terrain, which material contains plant life and fiber, (a) a frame, (b) a reservoir mounted on said frame, and a pump mounted on said frame, (c) a first shaft extending into said reservoir and journaled therein for rotation, (d) longitudinally and circumferentially spaced apart, spirally arranged impeller mixing blades on said first shaft, within said reservoir, along a portion of the length thereof, (e) radially extending blades forming an impeller, which impeller is mounted on said first shaft near one end of said reservoir to receive hydraulic material thereinto from said spirally arranged impeller mixing blades, (f) a power plant mounted on said frame and being connected in driving relation with said shaft mounting said impeller mixing blades, (g) an outlet pipe connecting the lower portion of said reservoir with said pump, (h) a discharge pipe extending outwardly from said pump to discharge hydraulic material onto the terrain, (i) transmission drive means connecting said power plant to said pump to selectively drive said pump, (j) a second transmission drive means connected to said first power plant and to said shaft which mount said impeller mixing blades to rotate said shaft mountng said impeller mixing blades, (k) a second shaft extending into said reservoir near the upper end thereof, which second shaft is parallel to said first shaft, (l) pointed fingers secured to and extending outward from said second shaft, (m) a third transmission means connecting said power plant in driving relation with said second shaft for rotation of said second shaft with said pointed fingers thereon, (n) a support plate mounted longitudinally in said reservoir, near the top thereof, said support plate being in close proximity to said second shaft having said outwardly extending pointed fingers thereon, (o) downwardly extending fingers mounted on the lower side of said support plate and being spaced in close proximity to the outer ends of said pointed fingers on said second shaft, (1) said support plate forming an opening between a side of said plate and the wall of said reservoir through which to direct fibrous material onto said pointed fingers secured to said second shaft, and (2) said fingers of said second shaft being adapted to rotate in close proximity to said pointed fingers mounted on said support plate so as to disintegrate compressed fiber and to direct the disintegrated fiber into said reservoir.

4. A hydraulic planting apparatus for dispensing hydraulic material, containing plant life, onto the terrain, which apparatus comprises:

(a) a reservoir, (1) a mixing element extending into said reservoir, (2) a power plant connected in driving relation with said mixing element, (b) a pump, (1) a pipe connecting the lower portion of said reservoir with said pump, (2) said pump having an outlet pipe connected thereto and extending outwardly therefrom, (3) a third pipe connected to said pipe which connects reservoir and said pump, (c) transmission drive means connecting said power plant and said pump to selectively drive said pump, (d) a seeder attachment connected to the upper end of said third pipe, (1) said seeder attachment having a base, (2) said seeder attachment having an axial hole formed in the base thereof, (3) said base of said seeder attachment having an outlet hole formed therein a spaced distance from said axial hole, (4) a rotatable disc mounted on said base, (i) said disc having circumferentially spaced apertures formed therein, and an axial hole formed therein;

(ii) means on said disc for selectively rotating said disc with respect to said base, (iii) an axle secured to said base and adapted to interfit within the axial hole within said disc for rotation of said disc about said axle, (5) a cover plate, having an axial hole formed therein, mounted on said rotatable disc and having circumferentially spaced holes formed therein, (6) the circumferentially spaced holes in said cover plate and the circumferentially spaced apertures in said disc being in register when said disc is rotated to a certain position, (e) a tubular member extending upward from said hole in said cover remote from the circumferential hole in said base, and (f) a hopper connected with said tubular member.

5. A hydraulic planting attachment for dispensing hydraulic material containing plant life, as defined in claim 4; wherein (a) said seeder attachment has an inlet opening formed therein, (b) the circumferentially spaced apertures in said disc forming seed receiving pockets, (c) said disc having a discharge opening which is in axial alignment with an opening in said cover plate.

6. A hydraulic planter attachment for dispensing hydraulic material containing plant life, as defined in claim 4, wherein:

(a) said seeder attachment has a base, (1) an axial, non-rotatable member fitted in said base and securing said cover of said seeder attachment in fixed relation with respect thereto,
(2) said cover having an opening formed in the upper side thereof for feeding seed thereinto, which opening is in register with said axial, non-rotatable member to form seed receiving pockets,
(3) the outlet opening in said base being adapted to register with an opening in said rotatable disc and said cover upon rotation of said disc, and
(4) said holes in said rotatable member being spaced apart to close said opening in said base when in one position.

7. A hydraulic planter attachment for dispensing hydraulic material containing plant life, as defined in claim 6, wherein:
(a) the apertures in said rotatable disc are spaced apart a distance greater than the diameter of the discharge hole in said base.

8. A hydraulic planting attachment for dispensing hydraulic material containing plant life, as defined in claim 4, wherein:
(a) a base is provided for said seeder attachment,
(1) said base having an axial hole formed therein,
(2) a cylindrical disc mounted on said base for relative rotation with respect thereto,
(b) a cylindrical cover,
(1) said cylindrical cover having an axial hole formed therein,
(2) means securing said cover and said base fixed against relative rotation,
(3) said cover having diametrically opposed holes formed therein,
(4) said rotatable disc having circumferentially spaced holes formed therein, which holes are adapted to register with said holes in said cover when in certain positions,
(5) said base having a discharge hole formed therein which is normally in register with one of said holes in said cover, and
(i) said holes in said cover being of a diameter to register with the apertures in said rotatable disc when said disc is in one position.

9. A hydraulic planting apparatus for dispensing hydraulic material containing grass sprigs and seeds onto the terrain, which apparatus comprises:
(a) a reservoir,
(b) means within said reservoir for mixing grass sprigs into a hydraulic mixture,
(c) a pump associated with said reservoir for withdrawing said mixture from said reservoir and directing the mixture outward through a conduit,
(d) a pipe associated with the inlet of said pump,
(e) a seed dispenser connected to said pipe, which dispenser includes,
(1) an apertured base,
(i) said pipe associated with said inlet of said pump being connected to said apertures in said base,
(2) an intermediate rotary member mounted on said base and rotatable with respect thereto,
(3) a hopper positioned above said rotatable member and having an outlet formed therein,
(4) said apertures and said rotatable member adapted to register with said outlet in said hopper when in one position and with said aperture within said base when in another position.

10. A seeder for dispensing measured quantities of loose seed into the suction side of a pumping system, for performing hydraulic planting, which seeder comprises;
(a) an apertured base,
(1) said aperture in said base adapted to be connected with the suction side of the pumping system,
(b) an apertured, rotatable member associated with said base,
(1) said apertures in said rotatable member adapted to selectively register with the aperture in said base when the respective apertures in said rotatable member are in certain positions,
(c) a hopper associated with said rotatable member and being fixed aaginst relative movement with respect to said base,
(1) said hopper having an outlet formed therein which outlet is adapted to register with the respective apertures in said rotatable member, when said rotatable member is in certain positions,
(d) said apertures in said rotatable member being spaced a sufficient distance apart to close said aperture in said base when said rotatable member is in one position, and
(e) means attached to said rotatable member whereby said member can be rotated.

11. A hydraulic planting apparatus for dispensing an aqueous slurry of hydraulic material onto the terrain, which material contains grass sprigs and a fiber, which apparatus comprises;
(a) a frame,
(b) a reservoir mounted on said frame,
(c) a pumping system mounted on said frame and being operatively associated with said reservoir,
(d) a prime mover connected in driving relation with said pumping system,
(e) said reservoir including a primary mixer journaled therein near the bottom thereof,
(f) a fiber disintegrator and secondary mixer mounted near the upper side of said reservoir and having outwardly extending fingers secured thereto,
(g) downwardly extending fingers associated with said reservoir and being spaced in close proximity to said pointed fingers of said fiber disintegrator and secondary mixer,
(h) said primary mixer and said fiber disintegrator and secondary mixer being operatively associated with said prime mover, and
(i) hydraulic slurry dispensing conduit associated with the discharge of said pumping system to discharge a hydraulic mixture containing an aqueous slurry, fiber and grass sprigs.

References Cited
UNITED STATES PATENTS

| | | | |
|---|---|---|---|
| 2,031,262 | 2/1936 | Hill | 222—178 X |
| 2,833,224 | 5/1958 | Meyer et al. | 103—126 |
| 2,919,054 | 12/1959 | Waller | 222—178 |
| 3,159,315 | 12/1964 | Friesen | 222—178 X |

ROBERT B. REEVES, *Primary Examiner.*

HADD S. LANE, *Examiner.*